United States Patent
Madan et al.

(10) Patent No.: US 12,367,702 B2
(45) Date of Patent: *Jul. 22, 2025

(54) METHODS AND APPARATUS FOR SIMULATING A VIRTUAL CAMERA USING A COMPUTER TO GENERATE ANALYTICS OF A VIDEO

(71) Applicant: Verkada Inc., San Mateo, CA (US)

(72) Inventors: Thantham Madan, San Mateo, CA (US); Hao Nan, Sunnyvale, CA (US); Arthur Kopatsy, Truckee, CA (US); Feng Jiang, San Mateo, CA (US); Lunce Fu, San Mateo, CA (US); Rohan Sood, San Mateo, CA (US)

(73) Assignee: Verkada Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/647,482

(22) Filed: Apr. 26, 2024

(65) Prior Publication Data

US 2025/0087017 A1 Mar. 13, 2025

Related U.S. Application Data

(63) Continuation of application No. 18/466,389, filed on Sep. 13, 2023, now Pat. No. 12,002,286.

(51) Int. Cl.
*G06V 40/16* (2022.01)
*H04L 65/65* (2022.01)

(52) U.S. Cl.
CPC .............. *G06V 40/16* (2022.01); *H04L 65/65* (2022.05)

(58) Field of Classification Search
CPC ................................ G06V 40/16; H04L 65/65
See application file for complete search history.

(56) References Cited

U.S. PATENT DOCUMENTS

| 12,002,286 B1* | 6/2024 | Madan .................... H04L 65/65 |
|---|---|---|
| 2017/0093939 A1 | 3/2017 | Bar-Mashiah et al. |
| 2018/0316945 A1 | 11/2018 | Todd |
| 2020/0380266 A1 | 12/2020 | Nadathur et al. |
| 2023/0283813 A1 | 9/2023 | Briggs et al. |

OTHER PUBLICATIONS

Non-Final Office Action for U.S. Appl. No. 18/466,389 dated Nov. 6, 2023, 7 pages.
Notice of Allowance for U.S. Appl. No. 18/466,389 dated Feb. 6, 2024, 7 pages.

* cited by examiner

Primary Examiner — Phuoc Tran
(74) Attorney, Agent, or Firm — COOLEY LLP

(57) ABSTRACT

A non-transitory, processor-readable medium stores instructions that, when executed by a processor, cause the processor to generate, using a first compute device, a video file. The non-transitory, processor-readable medium also stores instructions that, when executed by a processor, cause the processor to cause the video file to be sent to a second compute device that is cloud based, to cause the second compute device to: encode the video file, using a set of at least one software container, to generate an encoded video file; execute, at the set of at least one software container, a streaming protocol to generate a stream based on the encoded video file; and cause, via the set of at least one software container, generation of a set of analytics associated with the video file, based on the stream and using a virtualized software application environment.

20 Claims, 7 Drawing Sheets

300

Generate, using a first compute device, a video file 302

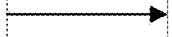

Cause the video file to be sent to a second compute device that is cloud based, to cause the second compute device to: encode the video file, using a set of at least one software container, to generate an encoded video file; execute, at the set of at least one software container, a streaming protocol to generate a stream based on the encoded video file; and cause, via the set of at least one software container, generation of a set of analytics associated with the video file, based on the stream and using a virtualized software application environment 304

FIG. 3

Receive, at a cloud compute device, a plurality of video files from a plurality of remote compute devices 402

Generate, via the cloud compute device and for each video file from the plurality of video files, a set of analytics from a plurality of sets of analytics, by: encoding that video file, at a first container from a set of software containers, to generate an encoded video file; multiplexing and/or packetizing the encoded video file at a second container from the set of software containers, to generate a video stream; and causing generation, via a third container from the set of software containers, of a set of analytics associated with that video file and included in the plurality of sets of analytics, based on the stream and using a virtualized software application environment 404

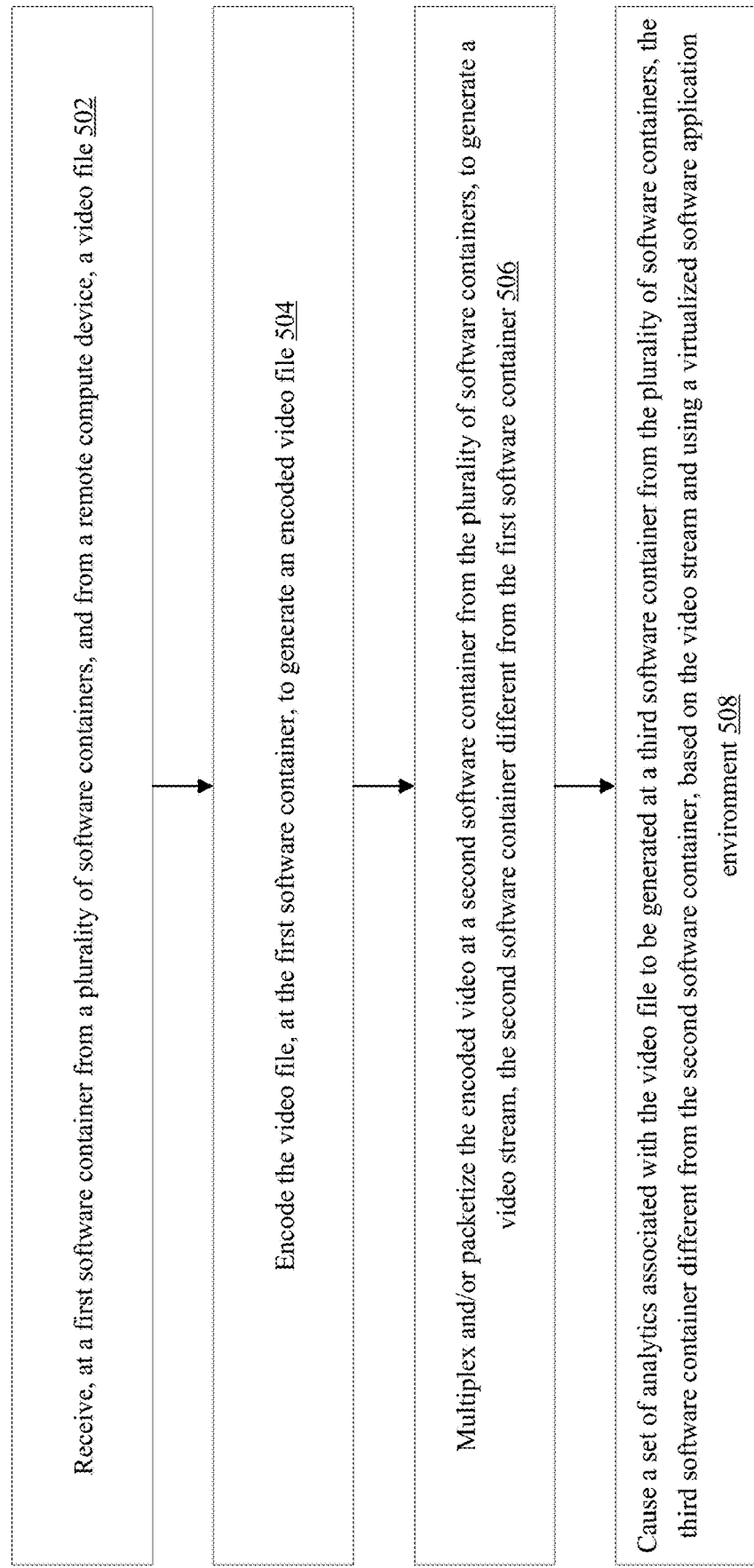

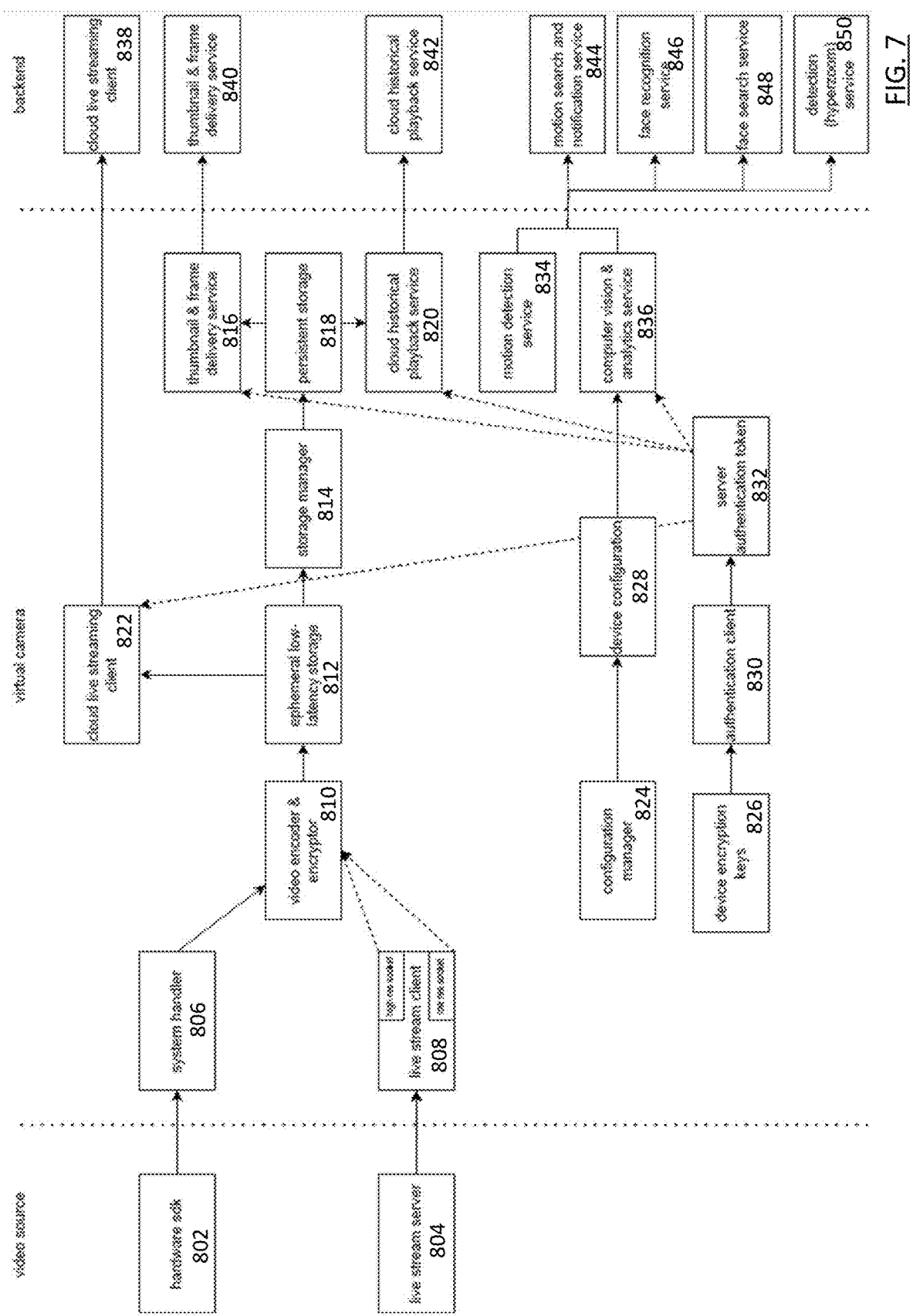

METHODS AND APPARATUS FOR SIMULATING A VIRTUAL CAMERA USING A COMPUTER TO GENERATE ANALYTICS OF A VIDEO

CROSS REFERENCE TO RELATED APPLICATIONS

This application is a continuation of U.S. patent application Ser. No. 18/466,389, filed Sep. 13, 2023, entitled "Methods and Apparatus for Simulating a Virtual Camera Using a Computer to Generate Analytics of a Video," now U.S. Pat. No. 12,002,286, the disclosure of which is incorporated by reference herein in its entirety.

FIELD

One or more embodiments are related to methods and apparatus for simulating a virtual camera using a computer to generate analytics of a video.

BACKGROUND

Analytics extracted from videos can be desirable. Sometimes, however, the video compute devices (e.g., cameras) that capture the videos are not accessible. Accordingly, it can be desirable to test software updates and/or extract analytics from videos without having access to the video compute devices that captured the videos themselves.

SUMMARY

In an embodiment, a non-transitory, processor-readable medium stores instructions that, when executed by a processor, cause the processor to generate, using a first compute device, a video file. The non-transitory, processor-readable medium further stores instructions that, when executed by a processor, cause the video file to be sent to a second compute device that is cloud based, to cause the second compute device to: encode the video file, using a set of at least one software container, to generate an encoded video file; execute, at the set of at least one software container, a streaming protocol to generate a stream based on the encoded video file; and cause, via the set of at least one software container, generation of a set of analytics associated with the video file, based on the stream and using a virtualized software application environment.

In an embodiment, a method includes receiving, at a cloud compute device, a plurality of video files from a plurality of remote compute devices. The method further includes generating, via the cloud compute device and for each video file from the plurality of video files, a set of analytics from a plurality of sets of analytics, by: encoding that video file, at a first container from a set of software containers, to generate an encoded video file; multiplexing and packetizing the encoded video file at a second container from the set of software containers, to generate a video stream, and causing generation, via a third container from the set of software containers, of a set of analytics associated with that video file and included in the plurality of sets of analytics, based on the stream and using a virtualized software application environment.

In an embodiment, an apparatus includes a memory and a processor operatively coupled to the memory. The processor is configured to receive a video file at a first software container from a plurality of software containers and from a remote compute device. The processor is further configured to encode the video file, at the first software container, to generate an encoded video file. The processor is further configured to multiplex and packetize the encoded video at a second software container from the plurality of software containers, to generate a video stream, the second software container different from the first software container. The processor is further configured to cause a set of analytics associated with the video file to be generated at a third software container from the plurality of software containers, the third software container different from the second software container, based on the video stream and using a virtualized software application environment.

BRIEF DESCRIPTIONS OF THE DRAWINGS

FIG. 3 shows a flowchart of a method to generate a video file and cause generation of analytics associated with the video file, according to an embodiment.

FIG. 4 shows a flowchart of a method to receive video files and generate analytics for each video file, according to an embodiment.

FIG. 5 shows a flowchart of a method to generate analytics using software containers, according to an embodiment.

FIG. 7 is a diagram illustrating data flows between a video source, a virtual camera, and a backend, according to an embodiment.

DETAILED DESCRIPTION

Figure 1:
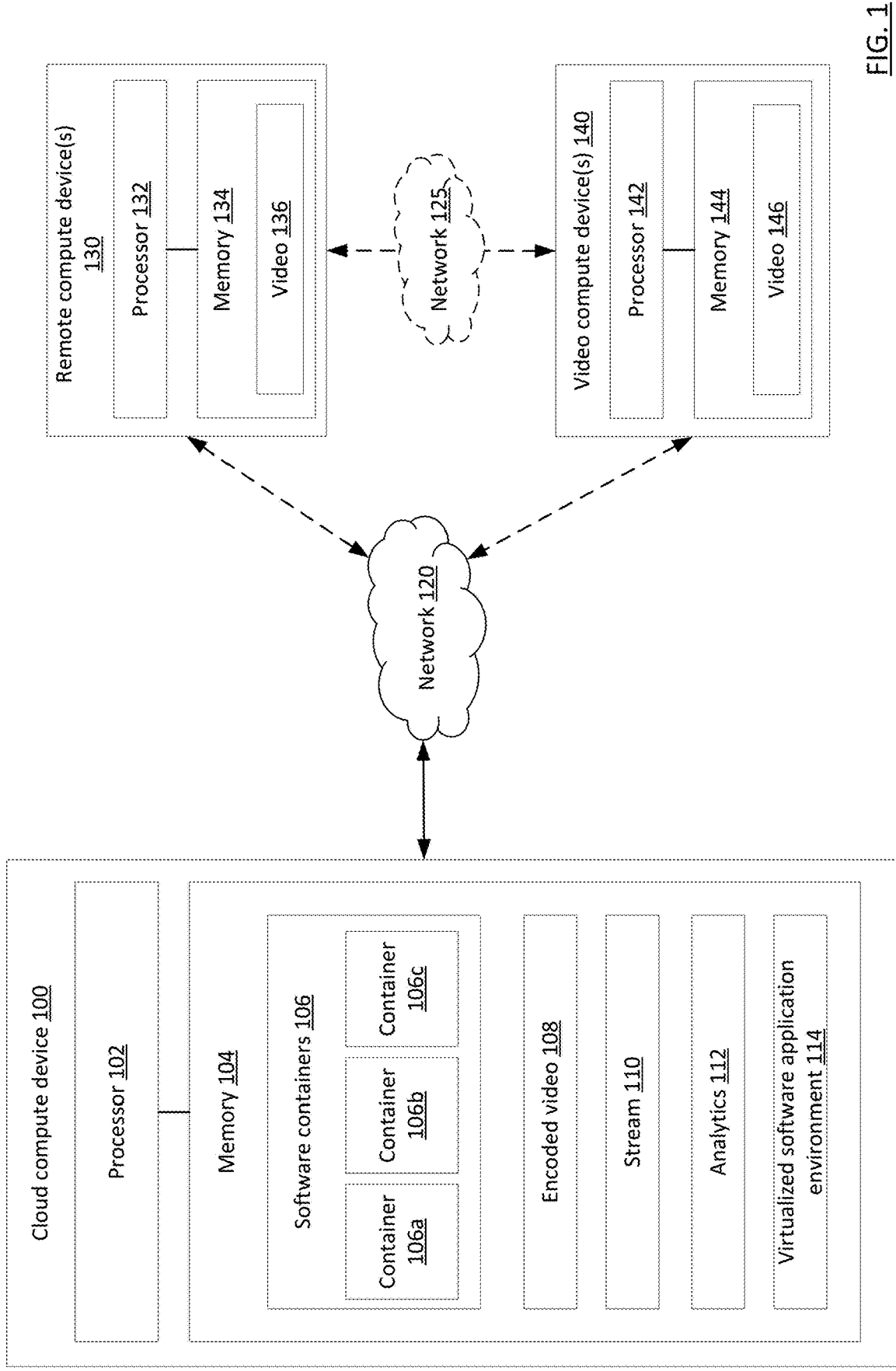
FIG. 1 illustrates a block diagram of a system for using a virtual camera, according to an embodiment.

In some implementations, operation of a "virtual camera" can refer to or include receiving one or more video files and providing/performing services relating to the video file, such as generating analytics based on the video file. For a company that provides services such as the generation of video analytics, and according to some embodiments set forth herein, such services may be performed without accessing the hardware that originally captured the associated video. This can be useful, for example, in situations where sharing/providing access to the hardware is undesirable.

A virtual camera can be a configurable and scalable "camera" that runs (executes) in the cloud, with the ability to stream any video file. By being unencumbered by the spatial and cost limitations of a physical camera, any number of virtual cameras can be provisioned quickly and easily. This allows both server-side and camera-side services. Virtual cameras can support, for example, generating analytics and/or computer vision features. Virtual cameras can be used to, for example, discover software/firmware bugs (e.g., occurring at a video compute device, camera, compute device configured to generate analytics based on a video, etc.), develop new pipelines, compute end-to-end metrics, and/or the like. In some implementations, a virtual camera is a system including two or more devices, across which camera functionalities associated with known physical cameras are distributed.

In some implementations, a virtual camera runs a containerized version of the firmware of a physical camera. The virtual camera itself can run as, for example, a Kubernetes pod. Within the pod, any number of containers can replicate the functionality of a physical camera. For example, in some implementations, three containers can be used. A first container can receive the video file (e.g., an mp4) and encode the video file using FFmpeg. The encoded video file can then be received by a second container that then relays the encoded video file as a stream. A third container can then run dockerized versions of camera services, such as motion detection, computer vision tasks (e.g., facial recognition, person detection, vehicle detection, crowd detection, line crossing detection, identifying a person of interest, optical character recognition (e.g., for applications such as license plate recognition)), and/or the like. From the perspective of a user, the user uses a "virtual camera" by selecting a video and receiving services for the video.

Virtual cameras can improve testing. Individual services no longer have to be evaluated under a lack of necessary context. Rather, virtual cameras can be rapidly prototyped and used to test on-camera services (e.g., generating analytics using compute vision). For example, thousands of virtual cameras can be built and provisioned in a matter of minutes, compared to hours for building and performing a firmware flash at a single physical camera.

In some implementations, a "container" or "software container" refers to a standard unit of software that packages up code and all its dependencies so an application runs quickly and reliably from one computing environment to another. In some implementations, a "container" or "software container" refers to packages of software that contain all of the necessary elements to run in any environment. In this way, containers can virtualize the operating system and run anywhere (e.g., from a private data center to the public cloud to a developer's personal laptop).

FIG. 1 illustrates a block diagram of a system for using a virtual camera, according to an embodiment. FIG. 1 includes cloud compute device 100 communicably coupled to remote compute device(s) 130 and/or video compute device(s) 140 via network 120. Optionally, remote compute device(s) 130 are communicably coupled to video compute device(s) 140 via network 125, which may be different from network 120.

Networks 120 and/or 125 can be any suitable communications network for transferring data, for example operating over public and/or private communications networks. For example, networks 120 and/or 125 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, networks 120 and/or 125 can be a wireless network such as, for example, a Wi-Fi® or wireless local area network ("WLAN"), a wireless wide area network ("WWAN"), and/or a cellular network. In other instances, the networks 120 and/or 125 can be a wired network such as, for example, an Ethernet network, a digital subscription line ("DSL") network, a broadband network, and/or a fiber-optic network. In some instances, networks 120 and/or 125 can use Application Programming Interfaces (APIs) and/or data interchange formats, (e.g., Representational State Transfer (REST), JavaScript Object Notation (JSON), Extensible Markup Language (XML), Simple Object Access Protocol (SOAP), and/or Java Message Service (JMS)). The communications sent via network 120 can be encrypted or unencrypted. In some instances, the networks 120 and/or 125 can include multiple networks or subnetworks operatively coupled to one another by, for example, network bridges, routers, switches, gateways and/or the like.

Video compute device 140 can be or include any type of camera that can capture images and/or video, such as a dome camera, bullet camera, fisheye camera, internet protocol (IP) camera, 4K camera, pan-tilt-zoom (PTZ) camera, Wi-Fi camera, license plate recognition (LPR) camera, and/or the like. Video compute device 140 can include processor 142 operatively coupled to memory 144 (e.g., via a system bus).

Processor 142 can be, for example, a hardware-based integrated circuit (IC) or any other suitable processing device configured to run and/or execute a set of instructions or code. For example, processor 142 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, processor 142 can be configured to run any of the methods and/or portions of methods discussed herein.

Memory 144 can be, for example, a random-access memory (RAM), a memory buffer, a hard drive, a read-only memory (ROM), an erasable programmable read-only memory (EPROM), and/or the like. Memory 144 can be configured to store any data used by processor 142 to perform the techniques (methods, processes, etc.) discussed herein. In some instances, memory 144 can store, for example, one or more software programs and/or code that can include instructions to cause processor 142 to perform one or more processes, functions, and/or the like. In some implementations, memory 144 can include extendible storage units that can be added and used incrementally. In some implementations, memory 144 can be a portable memory (for example, a flash drive, a portable hard disk, a SD card, and/or the like) that can be operatively coupled to processor 142. In some instances, memory 144 can be remotely operatively coupled with a compute device (not shown in FIG. 1). In some instances, memory 144 is a virtual storage drive (e.g., RAMDisk), which can improve I/O speed and in turn, accelerate image reading and writing.

Memory 144 can include (e.g., store) a representation of video 146. In some implementations, video 146 represents a video captured by video compute device 140, such as video representing security footage, vehicle traffic, and/or the like.

Cloud compute device 100 can be or include any type of compute device, such as a server, desktop, laptop, tablet, smartphone, and/or the like. Cloud compute device 100 includes processor 102 operatively coupled to memory 104 (e.g., via a system bus).

Processors 102 and/or 132 can be, for example, a hardware-based integrated circuit (IC) or any other suitable processing device configured to run and/or execute a set of instructions or code. For example, processors 102 and/or 132 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, processors 102 and/or 132 can be configured to run any of the methods and/or portions of methods discussed herein.

Memory 104 and/or 134 can be, for example, a random-access memory (RAM), a memory buffer, a hard drive, a read-only memory (ROM), an erasable programmable read-only memory (EPROM), and/or the like. Memory 104 and/or 134 can be configured to store any data used by processor 102 to perform the techniques (methods, processes, etc.) discussed herein. In some instances, memory 104 and/or 134 can store, for example, one or more software programs and/or code that can include instructions to cause processor 102 and/or 132 to perform one or more processes, functions, and/or the like. In some implementations, memory 104 and/or 134 can include extendible storage units that can be added and used incrementally. In some implementations, memory 104 and/or 134 can be a portable memory (for example, a flash drive, a portable hard disk, a SD card, and/or the like) that can be operatively coupled to the associated processor 102 and/or 132. In some instances, memory 104 and/or 134 can be remotely operatively coupled with a compute device (not shown in FIG. 1). In some instances, memory 104 and/or 134 is a virtual storage drive (e.g., RAMDisk), which can improve I/O speed and in turn, accelerate image reading and writing.

Memory 104 and/or 134 can include (e.g., store) software containers 106. Although FIG. 1 shows software containers 106 including three containers—containers 106a, 106b, 106c—in other implementations, any other number of containers can be used (e.g., one, four, five, ten, etc.). In some implementations, software containers 106 is associated with an internet protocol (IP) address unique to software containers 106, and no other software containers. Containers 106a, 106b, 106c can have a shared storage, share network resources, be co-located, be co-schedule, and/or run in a shared context. Software containers 106 can be, for example, a Kubernetes pod.

In some implementations, as shown in FIG. 1, software containers 106 includes three containers—containers 106a, 106b, 106c. Containers 106a, 106b, 106c can replicate the functionality of a physical camera without using the hardware of a physical camera, hence the term "virtual camera" in this context. Each container in software containers 106—container 106a, 106b, 106c—can resemble a virtual machine (VMs), each with its own central processing unit (CPU) share, filesystem, process space, memory, and more. All containers in software containers 106, however, can share the Operating System (OS) among applications. Containers 106a, 106b, 106c can each be, for example, a Kubernetes container.

In some implementations, container 106a can be configured to receive video 136 and/or 146 and generate encoded video 108. In some implementations, videos are received at remote compute device(s) 130 from video compute device(s) 140 and/or videos captured by video compute device(s) 140 are collected by the remote compute device(s) 130 (e.g., via network 125), optionally in accordance with one or more data sharing policies, and the videos may subsequently be transmitted to the cloud compute device 100 from the remote compute device(s) 130 (e.g., via network 120). In some implementations, encoded video 108 is generated based on (e.g., is a version of) video 136 and/or 146. Encoded video 108 may differ from video 136 and/or 146, for example, in that encoded video 148 may have a different bitrate and constant rate factor (e.g., that fits conditions of the cloud compute device and/or the cloud compute device 100's computing environment, which can be different from the conditions of video compute device 140's computing environment). Container 106a can use any technique to generate encoded video 108, such as Libay, GStreamer, OpenCV, LAV Filters, Pillow (PIL Fork), MLT Framework, HandBrake, Fast Forward Moving Picture Experts Group (FFmpeg), and/or the like.

In some implementations, container 106b is configured to execute a streaming protocol to generate stream 110 based on (e.g., using) encoded video 108. In some implementations, encoded video 108 represents video 136 and/or 146 in its entirety (e.g., not on a frame-by-frame basis), while stream 110 represents a frame-by-frame sequence of video 136 and/or 146 (e.g., sequence of images forming video 136 and/or 146). One reason generating a frame-by-frame sequence can be desirable is that analysis (e.g., by cloud compute device 100 using container 106c) can be performed on a frame-by-frame basis; this is similar to a lens of a physical camera that repeatedly sends a stream of images (i.e., a video) to a processor of the physical camera for processing. The streaming protocol can any dynamic media delivery protocol, such as Real Time Streaming Protocol (RTSP). In some implementations, the stream 110 is generated based on (e.g., using) encoded video 108 and using Libay, GStreamer, OpenCV, LAV Filters, PIL Fork, MLT Framework, HandBrake, FFmpeg, and/or the like. In some implementations, the streaming protocol includes multiplexing (e.g., combining) and/or packetizing (e.g., digitizing) based on encoded video 108 to generate stream 110. Multiplexing (e.g., RTSP multiplexing) can enable control of multiple media streams in one session (e.g., one RTSP session), similar to a television remote with different channels. This can be advantageous for offering varied content versions like languages or qualities without separate connections, streamlining resources and enhancing user options. Packetizing (e.g., RTSP packetizing) breaks multimedia data into smaller packets with content and timing instructions, which can be sent over network 120 and/or 125 (e.g., via protocols like RTSP); this can ensure more efficient, real-time streaming with error correction and synchronization. Reassembling these packets can result in smoother playback, even in the presence of network fluctuations. An advantage of the execution of the streaming protocol occurring in a separate container is that the video processing flow matches camera firmware. The modularity provided by using different containers allows for (1) the frame rate to be dynamically adjusted in a different container without modifying cloud compute device 100 itself and (2) a frame rate (e.g., eight frames per second) higher than that of known techniques to be used by cloud compute device 100.

In some implementations, container 106c is configured to use virtualized software application environment 114 to generate analytics 112 based on (e.g., using) stream 110. In some implementations, virtualized software application environment 114 can refer to a virtual environment that can be used for recreating software applications and their functionalities. In some implementations, a virtualized software application environment 114 can refer to a self-contained unit for running one or more interconnected containers (e.g., containers 106a, 106b, and 106c), isolating the one or more interconnected containers from other environments while allowing the one or more interconnected containers to share resources and/or network connectivity. In some implementations, virtualized software application environment 114 can refer to, for example, a dockerized application(s) configured to identify analytics 112 from stream 110. A dockerized application(s) can refer to, for example, an application configured to pack/store, deploy, and run applications using Docker containers. An advantage of using, for example, a virtualized software application environment 114 like Docker is increased portability, since Docker containers can encapsulate everything an application uses to run (and only those things) and allow applications to be shuttled easily between environments. In some implementations, virtualized software application environment 114 can facilitate efficient software deployment and execution within a contained environment. Virtualized software application environment 114 can enable the packaging, distribution, and/or execution of software applications in an isolated and standardized manner, abstracting underlying infrastructure and minimizing potential conflicts between software dependencies. This can result in enhanced portability, scalability, and consistency of software across various multiple different computing environments. Virtualized software application environment 114 can achieve this by utilizing lightweight virtualization techniques to encapsulate software, along with its runtime environment and dependencies, thereby promoting ease of deployment, configuration management, and resource utilization optimization. Virtualized software application environment 114 addresses challenges related to software deployment and execution by introducing an approach that significantly enhances the efficiency and reliability of the process.

Analytics 112 can represent analytics associated with (e.g., included in, represented by, derived from, etc.) video 136 and/or 146. Analytics 112 can include any type of analytic. Examples of analytics include an indication of whether motion was detected in video 136 and/or 146, at least one motion trajectory of an object in video 136 and/or 146, a number of people detected in video 136 and/or 146, information associated with a vehicle in video 136 and/or 146, a face detected in video 136 and/or 146, whether a predefined person is detected in video 136 and/or 146, at least one identity of and/or associated with a person depicted in video 136 and/or 146 (e.g., the person's name if pre-registered, a color of the person's clothes, a vector representing the person's face and/or body shape, etc.), and/or the like.

In some implementations, an action can occur automatically (e.g., without human intervention) in response to an analytic and/or predetermined combination of analytics from analytics 112. Examples of actions include causing an alert to be generated (e.g., at cloud compute device 100, video compute device 140, and/or a compute device not shown in FIG. 1), logging the analytic (e.g., at cloud compute device 100, video compute device 140, and/or a compute device not shown in FIG. 1), causing a compute device to shut down (e.g., at cloud compute device 100, video compute device 140, and/or a compute device not shown in FIG. 1), causing a compute device to receive a software update and/or hardware update (e.g., at cloud compute device 100, video compute device 140, and/or a compute device not shown in FIG. 1), outputting a recommendation (e.g., to mitigate a risk indicated by the analytics; at cloud compute device 100, video compute device 140, and/or a compute device not shown in FIG. 1), and/or the like. For example, detecting motion can cause an alert to be generated at cloud compute device 100, video compute device 140, and/or a compute device not shown in FIG. 1 (e.g., a security guard's compute device). As another example, if the number of people detected is greater than a predetermined acceptable threshold, a recommendation can be output at cloud compute device 100, video compute device 140, and/or a compute device not shown in FIG. 1, recommending removing some people until the number of people is less than the predetermined acceptable threshold. As another example, all detected faces within a predetermined time period can be stored for further analysis (e.g., by a human, by a machine learning model, and/or the like). As another example, if a vehicle committed a traffic violation, the license plate of the vehicle can be captured for generating a traffic ticket.

In some implementations, analytics 112 can indicate that a performance of video compute device 140, for a predefined feature, is outside a predetermined acceptable range. In such a case, a software update can be sent (e.g., by cloud compute device 100 and/or a compute device not shown in FIG. 1) to video compute device 140; in response to the software update, performance of video compute device 140 for the predefined feature can be inside the predetermined acceptable range. For example, analytics 112 can indicate that a perspective of video compute device 140 is outside a predetermined acceptable range, and a software update can be sent to video compute device 140 to cause the perspective to be within the predetermined acceptable range. As another example, analytics 112 can indicate that a depth of field of video compute device 140 is outside a predetermined acceptable range, and a software update can be sent to video compute device 140 to cause the depth of field to be within the predetermined acceptable range. As another example, analytics 112 can indicate that video compute device 140 is incorrectly counting the number of faces in video 136 and/or 146, and a software update can be sent to video compute device 140 to cause the number of faces to be more accurately counted. As another example, analytics 112 can indicate that video compute device 140 incorrectly determined that there is motion or that there is not motion, and a software update can be sent to video compute device 140 to cause motion to be more accurately detected. As another example, analytics 112 can indicate that video compute device 140 incorrectly determined information associated with a vehicle (e.g., wrong license plate number, wrong make or model, etc.), and a software update can be sent to video compute device 140 to cause the information associated with the vehicle to be more accurately determined. As another example, analytics 112 can indicate that video compute device 140 incorrectly identified a face, and a software update can be sent to video compute device 140 to cause faces to be more accurately identified. As another example, analytics 112 can indicate that video compute device 140 incorrectly determined that a predefined person is in a video when he/she is not in the video and/or that a predefined person is not in the video when he/she is in the video, and a software update can be sent to video compute device 140 to cause detection of people to be more accurately determined. As another example, analytics 112 can indicate that video compute device 140 incorrectly determined an identity associated with a person, and a software update can be sent to video compute device 140 to cause identity detection to be more accurate.

Although FIG. 1 showed video 146 being captured by a video compute device 140, in some implementations, video 146 can be any video (e.g., live video, pre-recorded video, etc.) captured by any compute device. Said differently, cloud compute device 100 can receive any video from any compute device to generate encoded video 108, stream 110, and analytics 112 based on that video. For example, video 146 can be a YouTube® video and cloud compute device 100 can receive the YouTube® video from a desktop computer. As another example, video 146 can be video previously captured by a camera, but cloud compute device 100 can receive the video from a laptop computer storing the video (instead of receiving the video from the camera itself).

Although FIG. 1 shows software containers 106 as including three containers, in some implementations, software containers 106 includes only one container. In such a case, in some implementations, the one container can perform the functionalities of containers 106a, 106b, 106c.

Although FIG. 1 shows three compute devices—cloud compute device 100 and video compute device 140—in other implementations, more or fewer compute devices can be used. For example, in some implementations, a single compute device can capture video 136 and/or 146 and generate encoded video 108, stream 110, and analytics 112 using virtualized software application environment 114. As another example, in some implementations, the functionalities of cloud compute device 100 can be performed across multiple compute devices, such as a first compute device (e.g., client device) configured to generate encoded video 108 and stream 110, and a second compute device (e.g., server device) configured to generate analytics 112 using virtualized software application environment 114.

Although FIG. 1 was discussed with respect to cloud compute device 100 receiving video 146 from video compute device 140, in some implementations, cloud compute device 100 can receive any number of video files from any number of compute devices (where the compute devices can be cameras, not cameras, or a combination thereof). In some implementations, cloud compute device 100 can receive multiple video files and generate analytics for each video file to identify trends (e.g., using a machine learning model). Trends can also be used to identify and/or implement remedial actions. Examples of remedial actions can include, by way of non-limiting example, causing one or more software updates to be sent/implemented and/or adjusting (or causing to be adjusted) a detection threshold or other computer vision threshold (e.g., in one or more backend services and/or at remote compute device(s) 130 of FIG. 1), for example to improve a user experience. Those remedial actions can occur at the compute devices that provided the video files to cloud compute device 100 and/or compute devices that did not provide any video files to cloud compute device 100. For example, different video files can each capture a different entrance of a building, and each video file can be analyzed to determine how many people enter the entrance associated with the video file. Trends can then be identified, such as which entrance is most popular; entrances where little to no people enter can be closed and/or entrances where a large number of people enter can be expanded. As another example, the trend may indicate that a subset of cameras in a set of cameras consistently fails to accurately count the number of faces in a video. In response, a software update to better count the number of faces in a video can be sent to just the subset of cameras (or, alternatively, the entire set of cameras). In some implementations, a software update can including adjusting a detection/computer vision threshold based on a trend. For example, if a trend indicates that most detection confidences are around 70% but the number of detections is low and the threshold for a detection is 75%, the threshold can be adjusted (upward or downward) to a different value (e.g., 70%, 71%, etc.). Or, if a trend indicates that most detection confidences are around 80% but the number of detections is high and the threshold for a detection is 75%, the threshold can be adjusted to a different value (e.g., 75%, 76%, etc.). Additionally or alternatively, in some implementations, any other remedial actions discussed herein can occur, such as sending a software update to cause the number of faces to be more accurately counted, motion detection to be more accurately determined, information associated with a vehicle to be more accurately determined, faces to be more accurately determined, person and/or identity detection to be more accurately determined, and/or the like.

Although not shown in FIG. 1, in some implementations, cloud compute device 100 further includes a graphics processing unit (GPU) operatively coupled to processor 102 and/or memory 104. The GPU can be any type of GPU. In some implementations, the GPU is used to perform computer vision tracking based on video 146 to generate analytics 112. In some implementations, the GPU is parallel computing platform and programming model like CUDA or OpenCL, which can accelerate computer vision tracking models that run at relatively higher frame rates.

In some implementations, cloud compute device 100 can receive video files from different types of compute devices, generate analytics for each video file, and compare the analytics to compare the different types of compute devices. For example, cloud compute device 100 can receive and generate analytics for video files captured by a first camera, receive and generate analytics for video files captured by a second camera different than the first camera, and compare both analytics to compare performance of the first and second cameras. This can be useful if, for example, the first camera is owned by a first company and the second camera is owned by a second company that wants to determine how they can upgrade/modify their second camera such that it performs as well as and/or better than the first camera.

Figure 2:
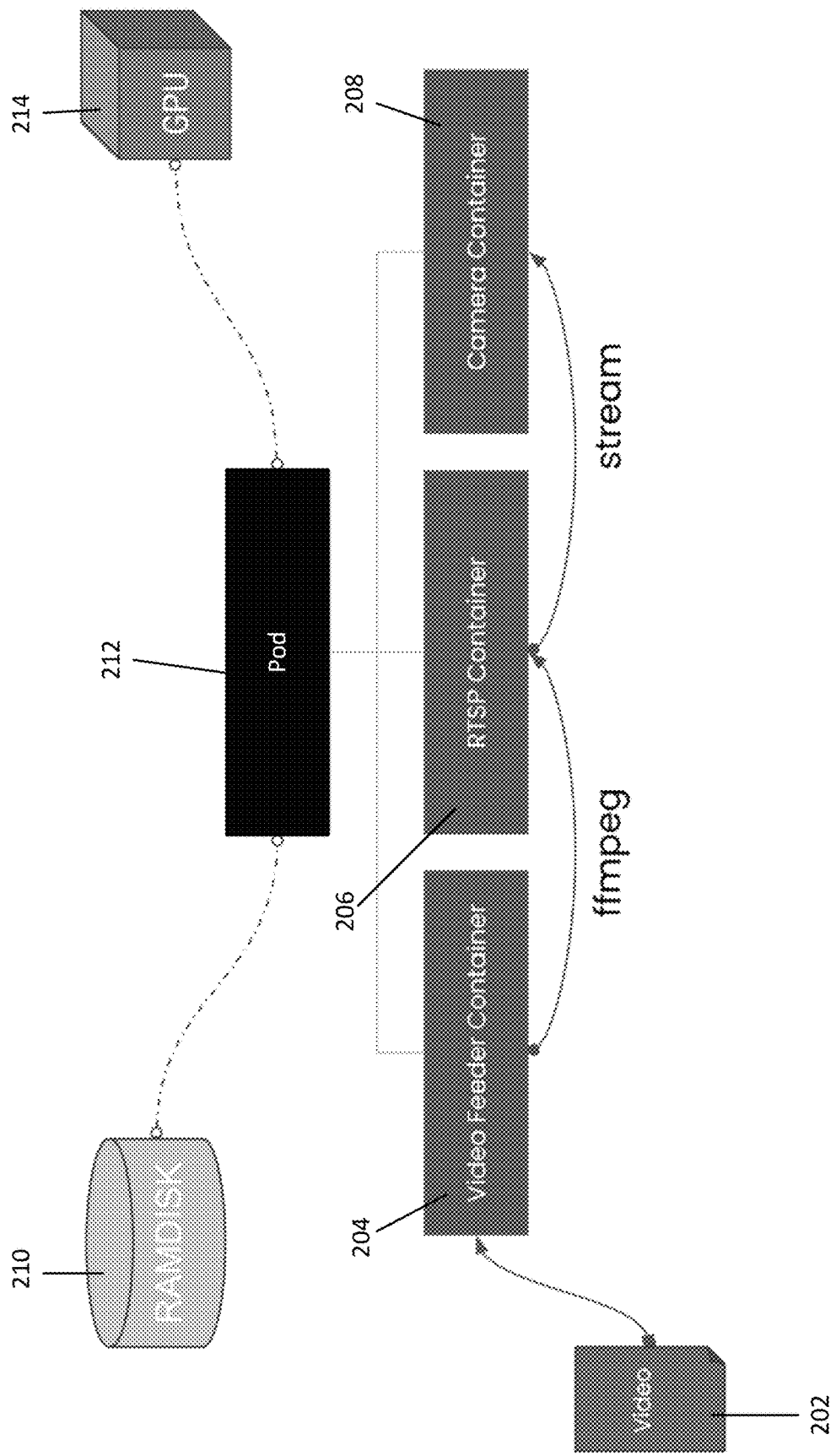
FIG. 2 illustrates a system architecture and flow for processing a video using a pod, according to an embodiment.

FIG. 2 illustrates a system architecture and flow for processing a video using a pod, according to an embodiment. FIG. 2 includes representations of video 202, RAMDISK 210, GPU 214, and pod 212, where pod 212 includes a video feeder container 204, a RTSP container 206, and a camera container 208. Pod 212 can be or include, for example, a Kubernetes pod. Pod 212 is an example of software containers 106 from FIG. 1. Pod 212 can be stored, for example, in RAMDISK 210. RAMDISK 210 is an example of memory 104 from FIG. 1.

Video 202 can be any type of video, and is an example of video 146 from FIG. 1. Video 202 can be provided to video feeder container 204, which is an example of container 106a. Video feeder container 204 can use an encoding technique like FFmpeg to generate an encoded video (e.g., encoded video 108). The encoded video output by video feeder container 204 can be provided to RTSP container 206, which is an example of container 106b. RTSP container 206 can convert the encoded video into a stream (e.g., stream 110). The stream output by RTSP container 206 can be provided to camera container 208, which is an example of container 106c. Camera container 208 can generate analytics (e.g., analytics 112) associated with video 202.

In some implementations, camera container 208 uses GPU 214 to perform computer vision techniques when generating the analytics. For example, GPU 214 may be used to decipher whether a face is of a predetermined person.

FIG. 3 shows a flowchart of a method 300 to generate a video file and cause generation of analytics associated with the video file, according to an embodiment. In some implementations, method 300 is performed by a processor (e.g., processor 142).

At 302, a video file (e.g., video 146) is generated using a first compute device (e.g., video compute device 140). At 304, the video file is caused to be sent to a second compute device (e.g., cloud compute device 100) that is cloud based. In response, the second compute device: encodes the video file using a set of at least one software container (e.g., software containers 106) to generate an encoded video file (e.g., encoded video 108); executes a streaming protocol at the set of at least one software container to generate a stream (e.g., stream 110) based on the encoded video file; and causes generation of a set of analytics (e.g., analytics 112) associated with the video file based on the stream and using a virtualized software application environment (e.g., virtualized software application environment 114). In some implementations, causing at 304 includes sending an electronic signal from the first compute device to the second compute device, the second compute device configured to perform 304 (e.g., automatically and without human intervention) in response to receiving the electronic signal.

In some implementations of method 300, the streaming protocol is a dynamic media delivery protocol (e.g., RTSP).

In some implementations of method 300, the set of at least one software container includes three containers (e.g., containers 106a, 106b, 106c). In other implementations, the set of at least one software container has only three containers. In other implementations, the set of at least one software container has only one container.

In some implementations of method 300, the second compute device is configured to encode the video file using a first container (e.g., container 106a) from the set of at least one software container during the encoding of the video file at 304. In some implementations of method 300, the second compute device is further configured to execute the streaming protocol using a second container (e.g., container 106b) from the set of at least one software container during the executing of the streaming protocol at 304. In some implementations of method 300, the second compute device is further configured to cause the generation of the set of analytics using a third container (e.g., container 106c) from the set of at least one software container during the causing of the generation of the set of analytics.

In some implementations of method 300, the set of analytics includes an indication of at least one of: whether motion was detected in the video file, at least one motion trajectory in the video file, a number of people detected in the video file, information associated with a vehicle in the video file, a face detected in the video file, whether a predefined person is detected in the video file, or at least one identity of a person depicted in the video file.

In some implementations of method 300, the set of analytics indicates that a performance of the first compute device, for a predefined feature, is outside a predetermined acceptable range. In response, some implementations of method 300 further include receiving, at the first compute device, a software update configured to cause subsequent performance of the first compute device for the predefined feature to be within the predetermined acceptable range.

FIG. 4 shows a flowchart of a method 400 to receive video files and generate analytics for each video file, according to an embodiment. In some implementations, method 400 is performed by a processor (e.g., processor 102).

At 402, a plurality of video files (e.g., video 146 and videos not shown in FIG. 1) are received at a cloud compute device (e.g., cloud compute device 100) from a plurality of remote compute devices (e.g., video compute device 140 and other compute devices not shown in FIG. 1). At 404, a set of analytics from a plurality of sets of analytics (e.g., analytics 112 and other analytics not shown in FIG. 1) are generated via the cloud compute device and for each video file from the plurality of video files, by: encoding that video file, at a first container (e.g., container 106a) from a set of software containers (e.g., software containers 106), to generate an encoded video file (e.g., encoded video 108); multiplexing and/or packetizing the encoded video file at a second container (e.g., container 106b) from the set of software containers, to generate a video stream (e.g., stream 110); and causing generation, via a third container (e.g., container 106c) from the set of software containers, of a set of analytics (e.g., analytics 112) associated with that video file and included in the plurality of sets of analytics, based on the stream and using a virtualized software application environment (e.g., virtualized software application environment 114). In some implementations, 402 occurs automatically (e.g., without human intervention) in response to completing 402.

Some implementations of method 400 further include identifying at least one trend based on the plurality of sets of analytics. Some implementations of method 400 further include causing implementation of a remedial action at a compute device that is remote from the plurality of remote compute devices, in response to identifying the at least one trend, and based on the at least one trend. Causing the remedial action can include, for example, sending an electronic signal to the remote compute device, the remote compute device configured to perform the remedial action in response to receiving the electronic signal.

Some implementations of method 400 further include comparing a first set of analytics from the plurality of sets of analytics to a second set of analytics from the plurality of sets of analytics. The first set of analytics can be associated with a first remote compute device from the plurality of remote compute devices and the second set of analytics can be associated with a second remote compute device from the plurality of remote compute devices. Comparing can include, for example, comparing mean values, media values, standard deviation values, and/or the like. Some implementations of method 400 further include determining, based on the comparing, that a performance of the first remote device for a task is worse than a performance of the second remote device for the task. Some implementations of method 400 further include causing the performance of the first remote compute device to be improved. Causing the performance of the first remote compute device to be improved can include, for example, a software and/or hardware update to the first remote compute device.

In some implementations of method 400, a first compute device from the plurality of remote compute devices includes a camera and a second compute device from the plurality of remote compute devices does not include a camera.

FIG. 5 shows a flowchart of a method 500 to generate analytics using software containers, according to an embodiment. In some implementations method 500 is performed by a processor (e.g., processor 102).

At 502, a video file (e.g., video 146) is received from a remote compute device (e.g., video compute device 140) and at a first software container (e.g., container 106a) from a plurality of software containers (e.g., software containers 106). At 504, the video file is encoded at the first software container to generate an encoded video file (e.g., encoded video 108). At 506, the encoded video is multiplexed and/or packetized at a second software container (e.g., container 106b) from the plurality of software containers to generate a video stream (e.g., stream 110). The second software container can be different from the first software container. At 508, a set of analytics (e.g., analytics 112) associated with the video file is caused to be generated at a third software container (e.g., container 106c) from the plurality of software containers based on the video stream and using a virtualized software application environment. The third software container can be different from the second software container. In some implementations, steps 504, 506, and/or 508 can occur automatically (e.g., without human intervention) in response to completion of the prior step.

In some implementations of method 500, the set of analytics includes an indication of whether motion was detected in the video file. In some implementations of method 500, the set of analytics includes an indication of the confidence/probability value indicating whether motion was detected in the video file.

In some implementations of method 500, the set of analytics includes an indication of at least one motion trajectory in the video file. The at least one motion trajectory can indicate, for example, direction, position(s) and/or speed. Present position and speed can also be used to predict future position.

In some implementations of method 500, the set of analytics includes an indication of an identity of a face depicted in the video file. For example, the face depicted in the video file can be compared to a database of faces associated with names to determine if there is a match.

In some implementations of method 500, the set of analytics includes a count of a number of people detected in the video file.

In some implementations of method 500, the remote compute device includes a camera. In other implementations, the remote compute device does not include a camera.

In some implementations of method 500, the memory is a virtual storage drive (e.g., RAMDISK 210).

In some implementations, method 500 is performed by a processor (e.g., processor 102) included in an apparatus. The apparatus can further include a memory (e.g., memory 104) operatively coupled to the processor. The apparatus can further include a graphics processing unit (GPU) (e.g., GPU 214) operatively coupled to the memory and the processor. The processor can be configured to cause the set of analytics to be generated using the GPU and by performing computer vision tracking based on the video file.

Some implementations of method 500 further include causing the remote compute device to be updated based on the set of analytics. Causing the remote compute device to be updated can include, for example, a software and/or hardware update to the remote compute device.

In some implementations of method 500, the virtualized software application environment includes a software application configured to perform a computer vision task using the video file.

Figure 6:
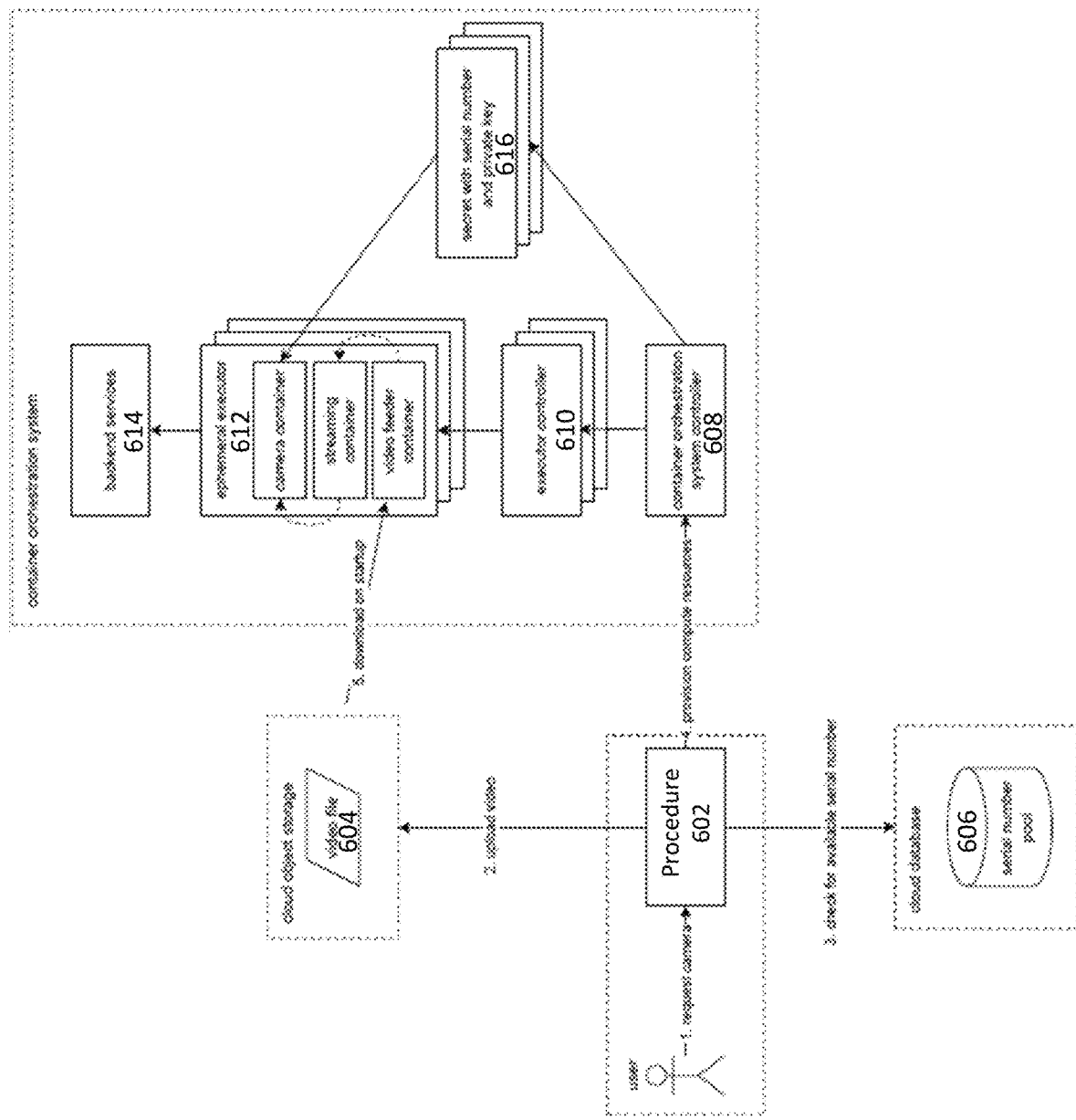
FIG. 6 shows a diagram illustrating using a virtual camera to generate analytics, according to an embodiment.

FIG. 6 shows a diagram illustrating using a virtual camera to generate analytics, according to an embodiment. Using a virtual camera can refer to, for example, having analytics generated for a video without having access to a device that generated the original video. At 602, a procedure (e.g., a startup script) can run (e.g., at video compute device 140) in response to a user (e.g., at a user device) requesting a virtual camera. The procedure can cause video file 604 (e.g., similar to video 146) to be sent to a cloud object storage (e.g., memory 104). Additionally, the procedure can allocate to the user a serial number from a pool 606 that includes a predetermined list of serial numbers (e.g., of cameras or virtual cameras). Additionally, the procedure can cause an electronic signal to be sent to container orchestration system controller 608, to provision/designate compute resources to handle the request. Container orchestration system controller 608 (of the depicted container orchestration system) can be represented by software code (e.g., at cloud compute device 100) and be configured to (1) provide a secret with the serial number and a private key 616 to the camera container (e.g., similar to container 106*c*) of ephemeral executor(s) 612 and (2) send instructions to executor controller 610. Executor controller 610 can be represented by software code (e.g., at cloud compute device 100) and be configured to send instructions to the video feeder container (e.g., similar to container 106*a*). In response to receiving the instructions from executor controller 610, and/or upon startup, the video feeder container can download video file 604 and generate an encoded video file (e.g., encoded video 108). The encoded video file can then be sent to the streaming container (e.g., similar to container 106*b*) for generating a stream (e.g., stream 110). The camera container can verify/validate the secret with the serial number and the private key 616 and obtain/provide access to backend services 614, such as the generation of analytics (e.g., analytics 112).

FIG. 7 is a diagram illustrating data flows between a video source (e.g., video compute device 140), a virtual camera (e.g., a client or "edge" compute device configured to generate encoded video 108 and stream 110), and a backend (e.g., a server compute device configured to generate analytics 112), according to an embodiment. The arrows in FIG. 7 represent data flows, and the boxes in FIG. 7 represent services within a microservices architecture. "Microservices" refers to an architectural style for developing software applications that allows a large software application to be separated into smaller independent parts, with each part having its own associated set of one or more responsibilities. FIG. 7 includes hardware sdk 802 and live stream server 804 as part of the video source. FIG. 7 further includes system handler 806, live stream client 808 (which further includes high resolution socket and low resolution socket), video encoder & encryptor 810, ephemeral low-latency storage 812, storage manager 814, thumbnail & frame delivery service 816, persistent storage 818, cloud historical playback service 820, cloud live streaming client 822, configuration manager 824, device encryption keys 826, device configuration 828, authentication client 830, server authentication token 832, motion detection service 834, and computer vision & analytics service 836 as part of the virtual camera. FIG. 7 further includes cloud live streaming client 838, thumbnail & frame deliver service 840, cloud historical playback service 842, motion search and notification service 844, face recognition service 846, face search service 848, and detection (hyperzoom) service 850 are part of the backend.

Combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. As such, all examples and/or embodiments are deemed to be non-limiting throughout this disclosure.

It is to be understood that the logical and/or topological structure of any combination of any program components (a component collection), other components and/or any present feature sets as described in the Figures and/or throughout are not limited to a fixed operating order and/or arrangement, but rather, any disclosed order is an example and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting.

What is claimed is:

1. A non-transitory, processor-readable medium storing instructions that, when executed by a processor, cause the processor to:
   generate, using a first compute device, a video file; and
   cause the video file to be sent to a second compute device that is cloud based, to cause the second compute device to:
      encode the video file, using a set of software containers, to generate an encoded video file;
      execute, using the set of software containers, a streaming protocol to generate a stream based on the encoded video file;
      cause, using the set of software containers, generation of a set of analytics associated with the encoded video file, based on the stream and using a virtualized software application environment;
      compare a first set of analytics that is from the set of analytics and associated with the first compute device to a second set of analytics that is from the set of analytics and associated with a third compute device different from the first compute device and the second compute device;
      determine, based on comparing the first set of analytics to the second set of analytics, that a performance of the first compute device for a task is worse than a performance of the third compute device for the task, and
      cause a modification at the first compute device in response to the determination that the performance of the first compute device for the task is worse than the performance of the third compute device for the task.

2. The non-transitory, processor-readable medium of claim 1, wherein the streaming protocol is a dynamic media delivery protocol.

3. The non-transitory, processor-readable medium of claim 1, wherein the encoded video file is generated using a first software container from the set of software containers, the stream is generated using a second software container from the set of software containers, and the set of analytics is generated using a third software container from the set of software containers.

4. The non-transitory, processor-readable medium of claim 1, wherein the first compute device is a first camera and the third compute device is a second camera different from the first camera.

5. The non-transitory, processor-readable medium of claim 1, wherein the set of analytics includes an indication of at least one of: whether motion was detected in the video file, at least one motion trajectory in the video file, a number of people detected in the video file, information associated with a vehicle in the video file, a face detected in the video file, whether a predefined person is detected in the video file, or at least one identity of a person depicted in the video file.

6. The non-transitory, processor-readable medium of claim 1, wherein the set of analytics indicates that the performance of the first compute device for the task is outside a predetermined acceptable range, and the non-transitory, processor-readable medium further stores instructions to cause the processor to:
   receive, at the first compute device, a software update configured to cause subsequent performance of the first compute device for the task to be within the predetermined acceptable range.

7. A method, comprising:
   receiving, at a cloud compute device, a plurality of video files from a plurality of remote compute devices;
   generating, via the cloud compute device and for each video file from the plurality of video files, a set of analytics from a plurality of sets of analytics, by:
      encoding that video file using a set of software containers, to generate an encoded video file;
      at least one of multiplexing or packetizing the encoded video file using the set of software containers to generate a video stream; and
      causing generation, using the set of software containers, of a set of analytics associated with that video file and included in the plurality of sets of analytics, based on the video stream and using a virtualized software application environment;
   comparing a first set of analytics from the plurality of sets of analytics to a second set of analytics from the plurality of sets of analytics, the first set of analytics associated with a first remote compute device from the plurality of remote compute devices, the second set of analytics associated with a second remote compute device from the plurality of remote compute devices;
   determining, based on the comparing, that a performance of the first remote compute device for a task is worse than a performance of the second remote compute device for the task; and
   causing the performance of the first remote compute device to be improved.

8. The method of claim 7, further comprising:
   identifying at least one trend based on the plurality of sets of analytics; and
   causing implementation of a remedial action at a compute device that is remote from the plurality of remote compute devices, in response to identifying the at least one trend, and based on the at least one trend.

9. The method of claim 7, wherein causing the performance of the first remote compute device to be improved includes causing a software update to occur at the first remote compute device.

10. The method of claim 7, wherein the first remote compute device includes a camera and the second remote compute device does not include a camera.

11. An apparatus, comprising:
a memory; and
a processor operatively coupled to the memory and configured to:
receive, from a first remote compute device, a video file;
encode the video file to generate an encoded video file;
at least one of multiplex or packetize the encoded video file to generate a video stream;
cause a set of analytics associated with the video file to be generated based on the video stream and using a virtualized software application environment;
compare a first set of analytics that is from the set of analytics and associated with the first remote compute device to a second set of analytics that is from the set of analytics and associated with a second remote compute device different from the first remote compute device;
determine, based on comparing the first set of analytics to the second set of analytics, that a performance of the first remote compute device for a task is worse than a performance of the second remote compute device for the task; and
cause the performance of the first remote compute device to be modified in response to the determination that the performance of the first remote compute device for the task is worse than the performance of the second remote compute device for the task.

12. The apparatus of claim 11, wherein the set of analytics includes an indication of at least one of: (1) whether motion was detected in the video file, (2) a motion trajectory in the video file, (3) an identity of a face depicted in the video file, or (4) a count of a number of people detected in the video file.

13. The apparatus of claim 11, wherein the encoded video file is generated at a first software container, the video stream is generated at a second software container different from the first software container, and the set of analytics associated with the video file is generated at a third software container different from the first software container and the second software container.

14. The apparatus of claim 11, wherein the encoded video file is generated via a set of software containers, the video stream is generated via the set of software containers, and the set of analytics associated with the video file is generated via the set of software containers.

15. The apparatus of claim 11, wherein the processor is further configured to, when causing the performance of the first remote compute device to be modified:
send a representation of a software update to the first remote compute device.

16. The apparatus of claim 11, wherein the first remote compute device includes a first camera and the second remote compute device includes a second camera different from the first camera.

17. The apparatus of claim 11, wherein the memory is a virtual storage drive.

18. The apparatus of claim 11, further comprising:
a graphics processing unit (GPU) operatively coupled to the memory and the processor, the processor configured to cause the set of analytics to be generated using the GPU and by performing computer vision tracking based on the video file.

19. The apparatus of claim 11, wherein the set of analytics indicates that the performance of the first remote compute device for the task is outside a predefined acceptable range, and the processor is further configured to:
send a representation of a software update to the first remote compute device for deployment thereon, to cause subsequent performance of the first remote compute device for the task to be within the predefined acceptable range.

20. The apparatus of claim 11, wherein the virtualized software application environment includes a software application configured to perform a computer vision task using the video file.

* * * * *